(12) United States Patent
Calloway et al.

(10) Patent No.: US 11,276,969 B2
(45) Date of Patent: Mar. 15, 2022

(54) BIDIRECTIONALLY INSTALLABLE INTERMEDIATE MODULAR ADAPTER FOR A RACK-MOUNTED PANEL

(71) Applicant: Optical Cable Corporation, Roanoke, VA (US)

(72) Inventors: Jamey O. Calloway, Weaverville, NC (US); Sumio Seo, Wallingford, VT (US); Derrick Stikeleather, Black Mountain, NC (US)

(73) Assignee: Optical Cable Corporation, Roanoke, VA (US)

( * ) Notice: Subject to any disclaimer, the term of this patent is extended or adjusted under 35 U.S.C. 154(b) by 282 days.

(21) Appl. No.: 16/750,605

(22) Filed: Jan. 23, 2020

(65) Prior Publication Data

US 2020/0280151 A1 Sep. 3, 2020

Related U.S. Application Data

(63) Continuation-in-part of application No. 16/291,929, filed on Mar. 4, 2019.

(60) Provisional application No. 62/637,681, filed on Mar. 2, 2018.

(51) Int. Cl.
| | |
|---|---|
| *H01R 13/73* | (2006.01) |
| *H01R 13/74* | (2006.01) |
| *H01R 13/518* | (2006.01) |
| *H01R 31/06* | (2006.01) |

(52) U.S. Cl.
CPC ......... *H01R 13/743* (2013.01); *H01R 13/518* (2013.01); *H01R 31/06* (2013.01)

(58) Field of Classification Search
CPC .............. H01R 13/743; H01R 23/7042; H01R 23/7026; H01R 33/46; H01R 13/742; H01R 13/74
USPC ........................................................ 439/357
See application file for complete search history.

(56) References Cited

U.S. PATENT DOCUMENTS

| | | | | |
|---|---|---|---|---|
| 5,117,330 A | * | 5/1992 | Miazga | .................. H05K 3/301 |
| | | | | 174/138 G |
| 6,648,681 B2 | * | 11/2003 | Ushiro | ................. H01R 13/743 |
| | | | | 439/557 |
| 8,075,344 B2 | * | 12/2011 | Shih | ........................ H04Q 1/09 |
| | | | | 439/649 |

* cited by examiner

*Primary Examiner* — Phuong Chi Thi Nguyen
(74) *Attorney, Agent, or Firm* — William G. Heedy; The Van Winkle Law Firm (57) ABSTRACT

A bidirectional intermediate modular adapter (500) can be installed from the front or the rear of a mounting panel. The body (502) of the modular adapter includes a front face (504), an opposing rear face (506), an opening (210) extending from the front face through the body to the opposing rear face, a first side surface (512) and an opposing second side surface (514), a flexible top surface (508) and an opposing lower surface (510). The flexible top surface has flexible beams (518A, 518B) and landings (528A, 528B), which define a deformable opening (520), and a first groove (526). The landings may have ramps (522A, 522B) at the sides thereof. The opposing lower surface has a second groove (540) extending at least partially lengthwise across thereof. The bidirectional intermediate modular adapter is preferably made of a nonconductive material with a conductive plating thereon.

17 Claims, 7 Drawing Sheets

SECTION A-A

BIDIRECTIONALLY INSTALLABLE INTERMEDIATE MODULAR ADAPTER FOR A RACK-MOUNTED PANEL

RELATED APPLICATIONS

This application is a continuation-in-part of U.S. Nonprovisional patent application Ser. No. 16/291,929 filed Mar. 4, 2019, entitled "Plated Modular Adapter," which claims priority to and incorporates entirely by reference U.S. Provisional Patent Application Ser. No. 62/637,681 filed Mar. 2, 2018, entitled "Plated Modular Adapter."

FIELD OF INVENTION

This invention relates to modular adapters for mounting different styles of connectors and, more particularly, to a bidirectionally installable intermediate modular adapter for a rack-mounted panel.

BACKGROUND OF THE INVENTION

RJ-45 style Ethernet connectors are often mounted within a standard sized 19-inch wide rack by means of metal or plastic mounting panels. These mounting panels are typically manufactured with cutouts to for use with specific types of connectors, meaning that different panels are needed for different particular types or styles of connectors, thus requiring multiple part numbers to identify the multiple different panels.

In order to simplify and modularize panel design, the cutouts or openings in a rack-mounted panel can be made larger. Utilizing larger openings in the rack-mounted panel allows for connectors to be mounted in an intermediate modular adapter, which can be molded from inexpensive plastic compounds and sized for receipt in the larger openings of the rack mounted panel. For example, an intermediate modular adapter may be designed such that the outer portion has dimensions which allow it to fit within the larger panel openings, while the inner area or openings within could be made to fit different styles of connectors, such as a 6-port data module or some number of discreet keystone modular jack ("KMJ") style connectors.

An intermediate modular adapter installed from the front of the panel, and the connectors are installed from the front of the intermediate modular adapter, so the intermediate modular adapter is not installed into the panel until after the wiring from the connectors has been drawn through the opening in the panel. This can be a tedious and time-consuming process, especially if the wiring comprises numerous and/or long cables.

Further, removing and/or replacing such an intermediate modular adapter, such as when the intermediate modular adapter has been damaged, is also a tedious and time-consuming process, especially if the wiring comprises numerous and/or long cables.

SUMMARY OF THE INVENTION

In accordance with one form of the invention, a bidirectionally installable intermediate modular adapter for a rack-mounted panel is provided. The bidirectional intermediate modular adapter comprises a body. The body includes a first face and an opposing second face, an opening extending from the first face through the body to the opposing second face, a first side surface and an opposing second side surface, a flexible top section, and an opposing lower surface. The flexible top section has a first groove, and the opposing lower surface has a second groove extending at least partially lengthwise thereacross. The body is preferably made of a non-conductive material coated, at least in part, with a conductive material.

The flexible top section may include a first flexible beam anchored at a first end of the flexible top section, a second flexible beam anchored at a second end of the flexible top section, and a latch between, supported by, and connected to, the first flexible beam and the second flexible beam.

The first flexible beam, the second flexible beam, and the latch define a deformable opening.

The latch may include first and second landings, and first and second stops, with the first groove being between and defined by the first and second stops. Alternatively, the latch may include ramps at the sides of the landings, with the first groove being between and defined by the ramps.

BRIEF DESCRIPTION OF THE DRAWINGS

For a fuller understanding of the nature of the present invention, reference should be made to the following detailed description, taken in conjunction with the accompanying drawings in which.

Like reference numerals refer to like parts throughout the several views of the drawings.

DETAILED DESCRIPTIION OF THE PREFERRED EMBODIMENTS

Referring to the several views of the drawings, the plated plastic intermediate modular adapter for mounting panels is shown and described herein.

Figure 1:
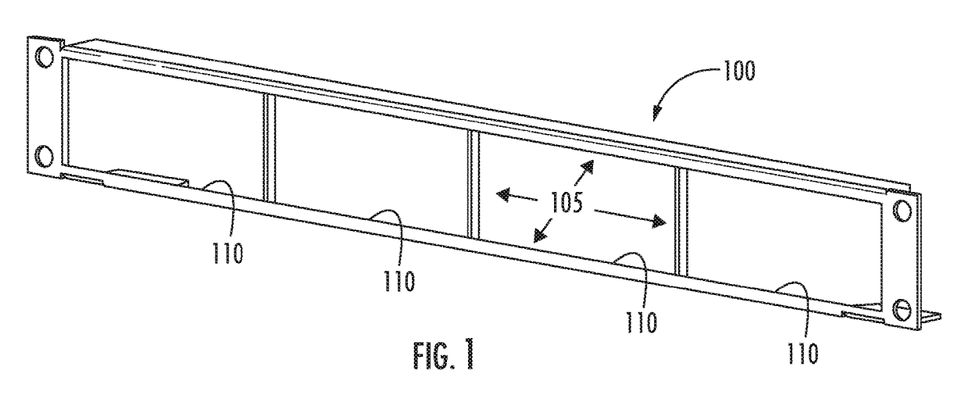
FIG. 1 is an exemplified illustration of a metal mounting panel with four cutouts.

Referring initially to FIG. 1, a metal mounting panel 100 is illustrated. The metal mounting panel 100 includes four large cutouts 110. The four large cutouts 110 form internal edges 105 on the mounting panel 100.

Figure 2A:
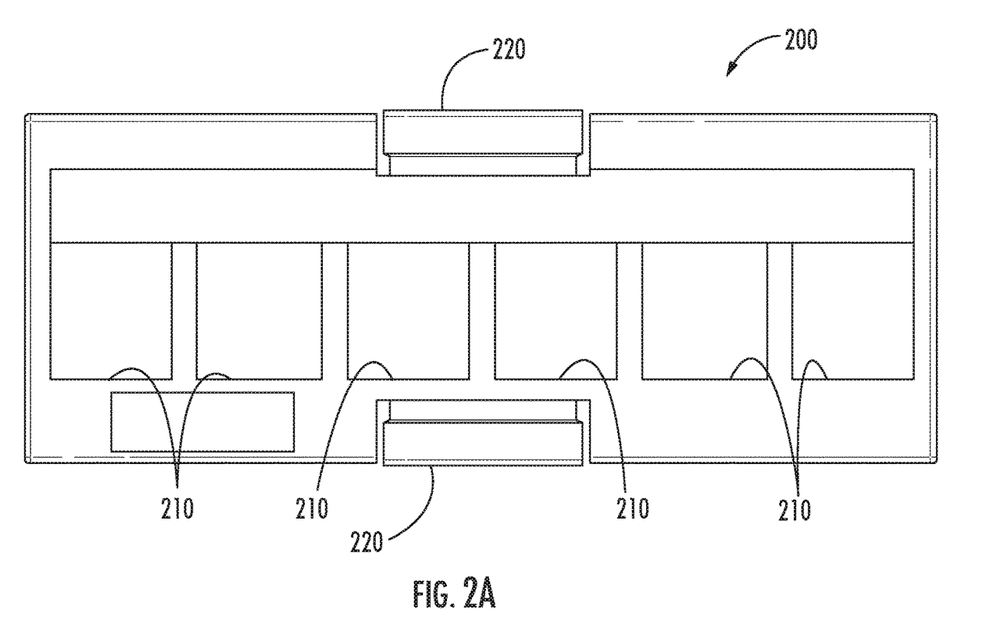
FIGS. 2A-2C are a front view, rear view, and perspective view, respectively, of a plastic intermediate modular adapter.
Figure 2B:
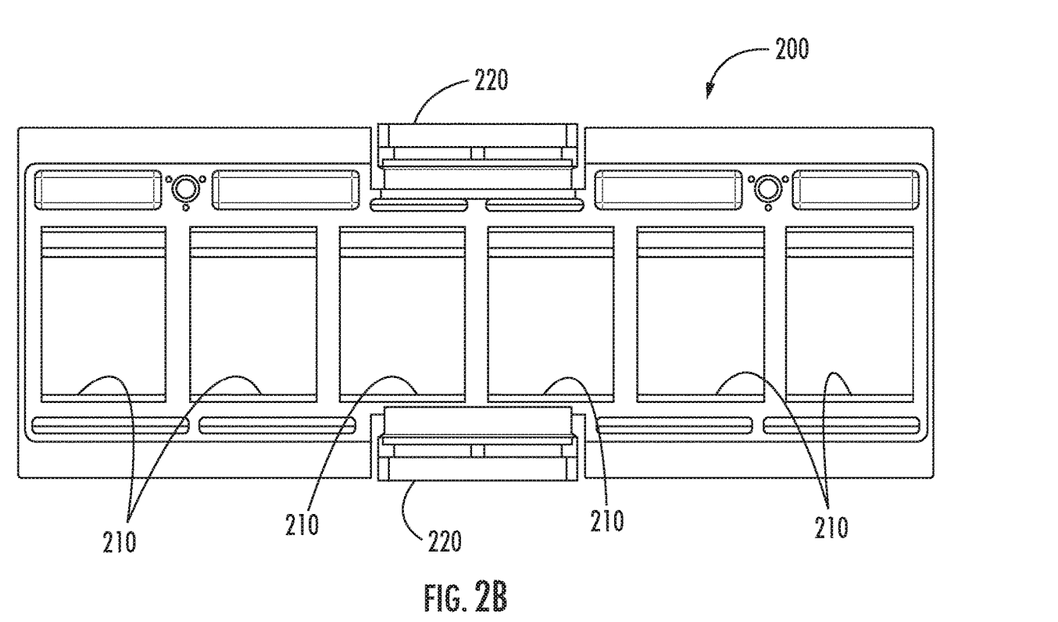
Figure 2C:
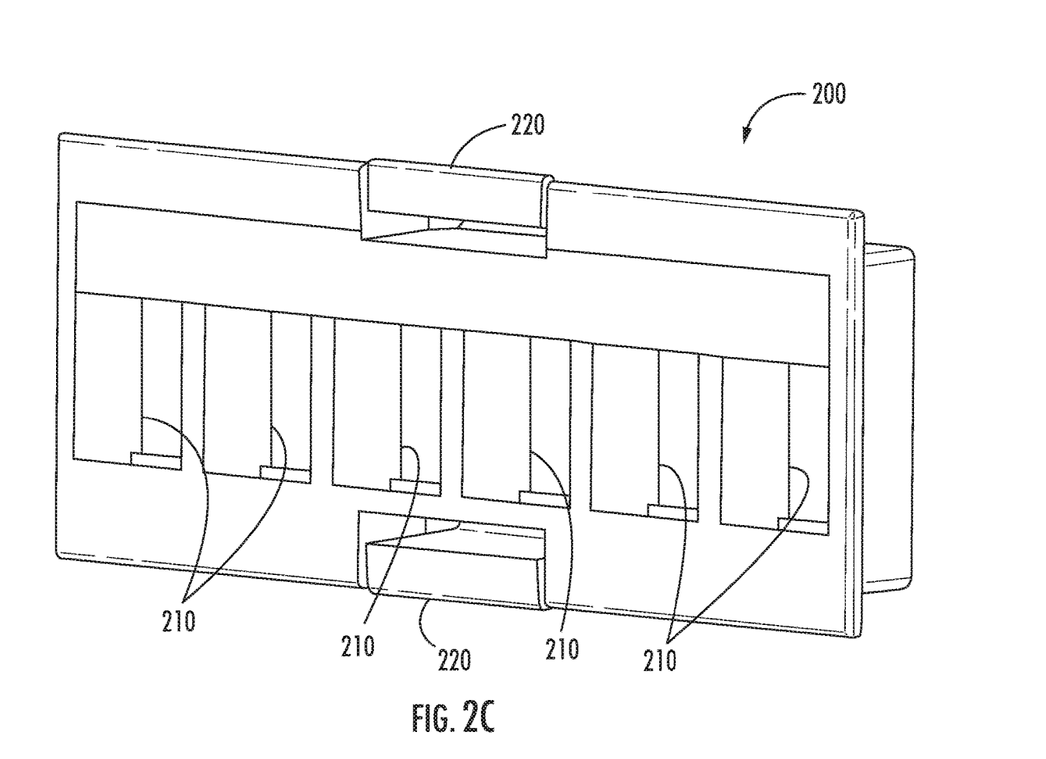

FIGS. 2A, 2B and 2C respectively illustrate front, rear and perspective views of a plastic intermediate modular adapter 200 in accordance with one nonlimiting embedment. The cutouts 110 accommodate intermediate modular adapters 200. Each intermediate modular adapter 200 has multiple openings 210 sized and configured for accommodating multiple connectors (connectors 300 are shown beginning in FIG. 3). There are six openings 210 designed to mount six corresponding KMJ style connectors on the plastic intermediate modular adapter 200. In the middle of the adapter 200, there are two latches 220, one approximate the top and the other approximate the bottom, which are utilized to mount the plastic intermediate modular adapter 200 on the metal mounting panel 100. Other configurations of the plastic intermediate modular adapter 200 are available for various types of connectors.

Figures 3, 4:
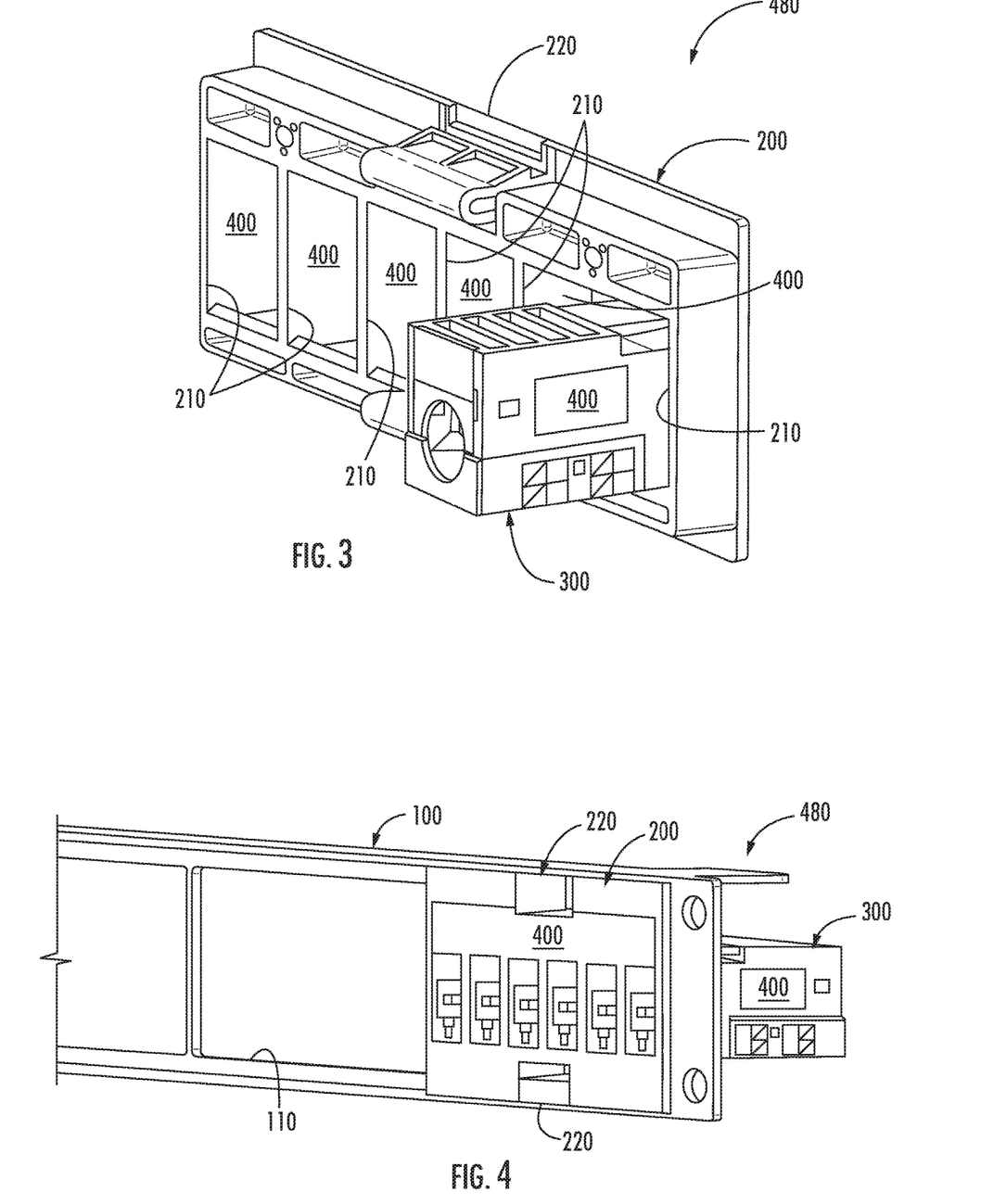
FIG. 3 is a perspective view illustrating the plastic plated modular adapter of the present invention and including connector secured thereto.
FIG. 4 is an isolated perspective view of the plastic plated modular adapter assembled to a metal panel frame.

Referring to FIG. 3, a connector 300 is inserted into one opening 210 of the plastic intermediate modular adapter 200. The plastic intermediate modular adapter 200 is plated all around its outer surface, wherein the plated plastic 400 is on the top side of the adapter 200. The connector 300 is also plated on its outside surface, wherein the plated plastic 400 is on the top side of the connector 300. When the connector 300 is inserted within one opening 210 of the plastic intermediate modular adapter 200, the plated plastic 400 on the outer surface of the connector 300 and the plated plastic 400 of the inner surface of the opening 210 are electrically connected. Thus, the connector 300 and the plastic intermediate modular adapter 200 are electrically integrated into a conductive assembly 480. Similarly, more connectors 300 can be inserted into additional openings 210.

Referring now to FIG. 4, one plastic intermediate modular adapter 200 accommodating six connectors 300 is mounted on one cutout 110 of the metal mounting panel 100. As described in FIG. 3, the connections between the plastic intermediate modular adapter 200 and the connectors 300 are through plastic plating. The connections between the plastic intermediate modular adapter 200 and the metal mounting panel 100 are through the direct connection of the plastic plating on the plastic intermediate modular adapter 200 and the unpainted surface of the metal mounting panel 100. As a result, the shielded metallic element in the connector 300 directly connects with the plastic intermediate modular adapter 200 into a conductive assembly 480. Such a conductive assembly 480 is mounted on the metal mounting panel 100 and directly connects with the unpainted surfaces on the metal mounting panel 100 and then with a panel frame that is connected to the ground structure. The grounding connection is completed from the connector 300 to the metal mounting panel 100 through a plastic intermediate modular adapter 200.

The plated adapter could also be designed for use in conjunction with un-shielded style connectors as a means of mitigating alien crosstalk between connectors, which is a growing concern with all category levels of data adapters since the introduction of the IEEE 802.3bz standard. This standard describes Ethernet data rates of 2.5 and 5 Gb/s over installed infrastructure. The plated modular adapter would allow end users to replace only the panel portion of the data channel, while allowing them to use currently installed connectors in the event that the alien crosstalk of the channel does not meet the requirements of the 802.3bz standard.

Figure 5:
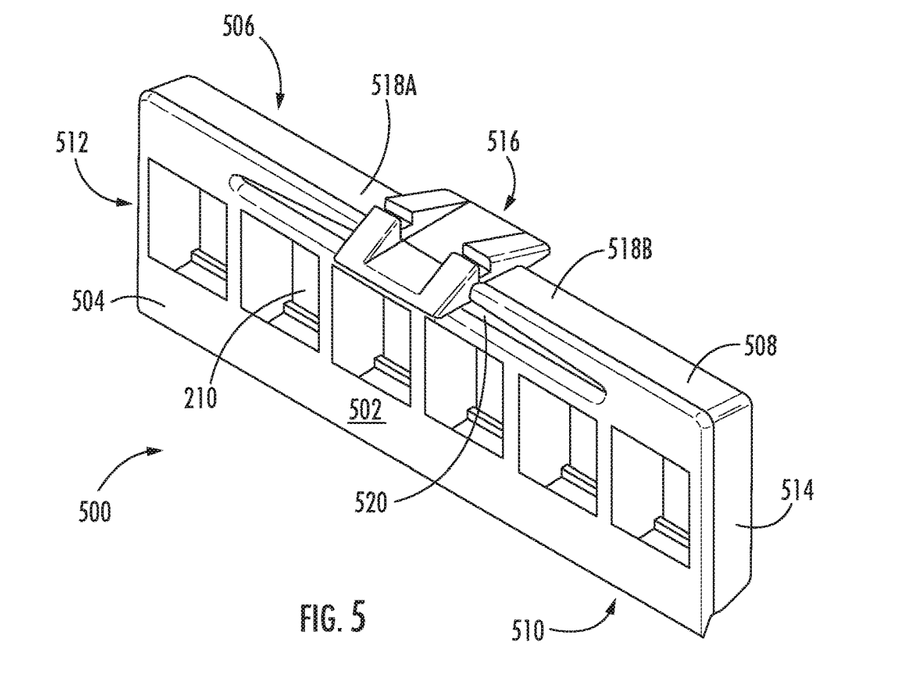
FIG. 5 is a perspective view of one embodiment of a bidirectionally insertable connector.

FIG. 5 is a front perspective view of a bidirectional intermediate modular adapter 500. This bidirectional intermediate modular adapter 500 can be installed from the front side or the rear side of the panel 100 (FIG. 1). The bidirectional intermediate modular adapter 500 has a body 502 which includes a plurality of connector openings 210 into which connectors 300, such as RJ-45 receptacles, may be installed. The body 502 of the bidirectional intermediate modular adapter 500 has a first face 504, such as a front face, a second face 506, such as a rear face, a flexible top surface 508, an opposing bottom surface 510, a left-side surface 512, an opposing right-side surface 514. The flexible top surface 508 comprises a latch 516, flexible beams 518A, 518B, and a deformable opening 520. The bidirectional intermediate modular adapter 500 also has plated plastic surfaces 400 as described above.

Figure 6:
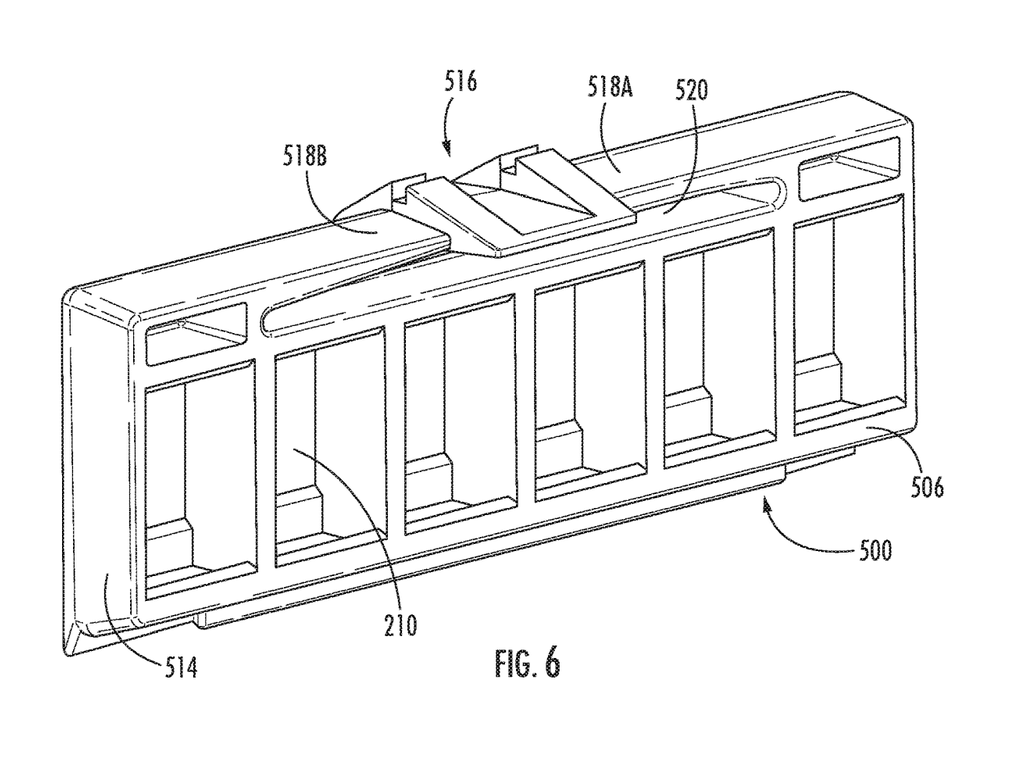
FIG. 6 is a rear perspective view of the bidirectionally insertable connector.

FIG. 6 is a rear perspective view of the bidirectional intermediate modular adapter 500 showing the openings 210, the second face 506, the right side surface 514, the latch 516, the flexible beams 518A, 518B, and the deformable opening 520. The latch 516 is between, supported by, and connected to, the flexible beams 518A, 518B. The deformable opening 520 is defined by the latch 516 and the flexible beams 518A, 518B. When downward pressure is exerted on the latch 516 such as when the bidirectional intermediate modular adapter 500 is being inserted into a cutout 110, the flexible beams 518A, 518B deflect downward, thereby allowing the latch to be pushed downward, and thereby deforming the opening 520. When the pressure is released, such as when the bidirectional intermediate modular adapter 500 has been inserted into a cutout 110, or removed from the cutout 110, the flexible beams 518A, 518B urge the latch 516 upward to enlarge or restore the deformable opening 520.

Figure 7:
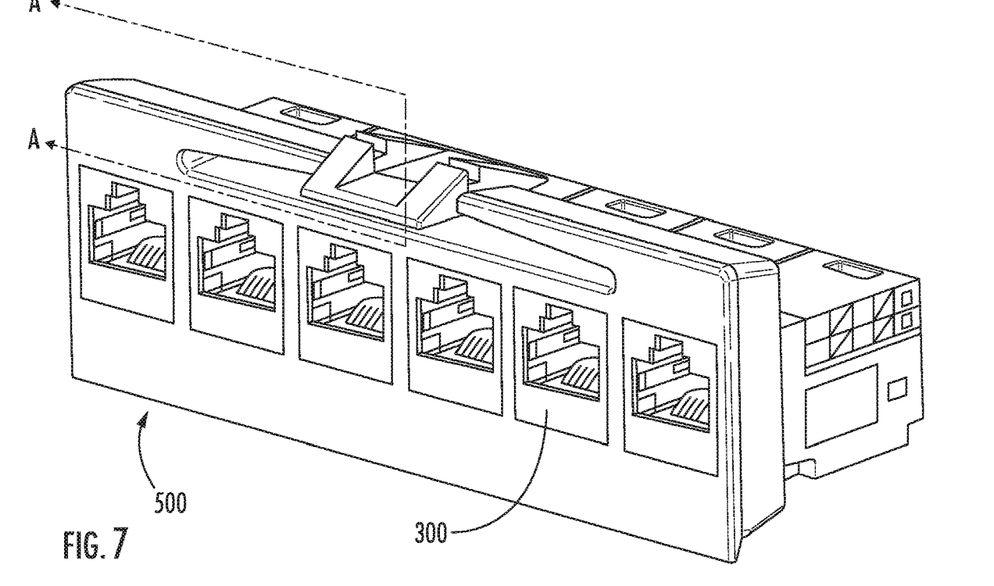
FIG. 7 is a front perspective view of the bidirectional panel insert showing connectors installed.

FIG. 7 is a front perspective view of the bidirectional intermediate modular adapter 500 showing connectors 300 installed therein, and also indicating cutaway line A-A.

Figure 8:
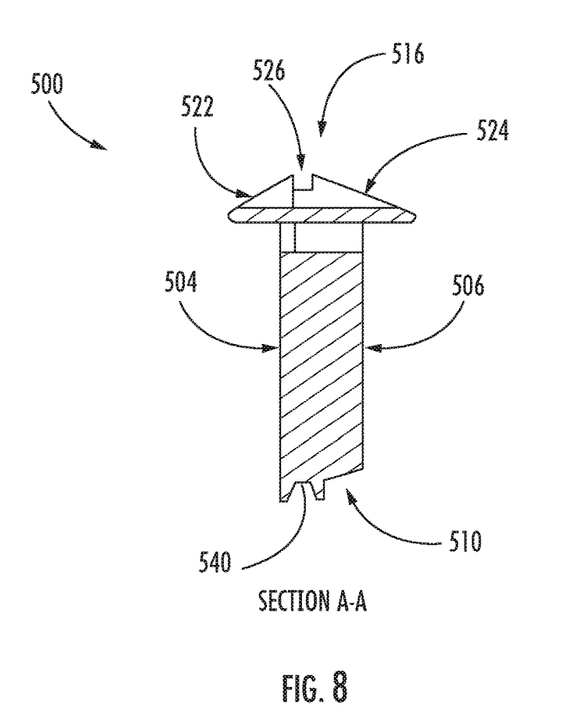
FIG. 8 illustrates a cutaway view along line A-A of FIG. 7.

FIG. 8 illustrates a cutaway view of the bidirectional intermediate modular adapter 500 along line A-A of FIG. 7, and shows a top groove 526 and a bottom groove 540. The grooves 526, 540 accept the top and bottom edges 105 of the metal mounting panel 100.

The top groove 526 is formed between a first ramp 522 and a second ramp 524. The first ramp 522 extends from the top groove 526 to at least the first face 504, and preferably extends beyond the first face 504. The second ramp 524 extends from the top groove 526 to at least the second face 506, and preferably extends beyond the second face 506. The top groove 526 may be centered between the first face 504 and the second face 506, or may be positioned off-center. As shown, the top groove 526 is positioned off center, being closer to the first face 504. The slope or angle of ramps 522 and 524 may be the same or they may differ from each other. As shown, the first ramp 522 has a slope which is greater than the slope of the second ramp 524. The first ramp 522, the second ramp 524, and the top groove 526 are part of the latch 516. It will be appreciated that the groove 526 may be defined, at least in part, by the ramps 522, 524.

The bottom groove 540 is formed on the bottom surface 510 of the bidirectional intermediate modular adapter 500. The bottom groove 540 may be centered between the first face 504 and the second face 506, or may be positioned off-center. As shown, the bottom groove 540 is positioned off center, being closer to the first face 504. The bottom groove 540 is shown as extending across a substantial portion of the bottom surface 510. The bottom groove 540 may, if desired, be longer or shorter but it should be long enough to retain the bidirectional intermediate modular adapter 500 in the mounting panel 100 under typical environmental stresses and conditions.

If the top groove 526 and the bottom groove 540 are in the same plane then the first face 504 may be in the same plane as the mounting panel 100. Alternatively, the top groove 526 and the bottom groove 540 may be in different planes so as to cause the first face 504 to incline slightly upward or slightly downward, if such inclination is more convenient, in a particular installation, for access to the connectors 300.

Figure 9:
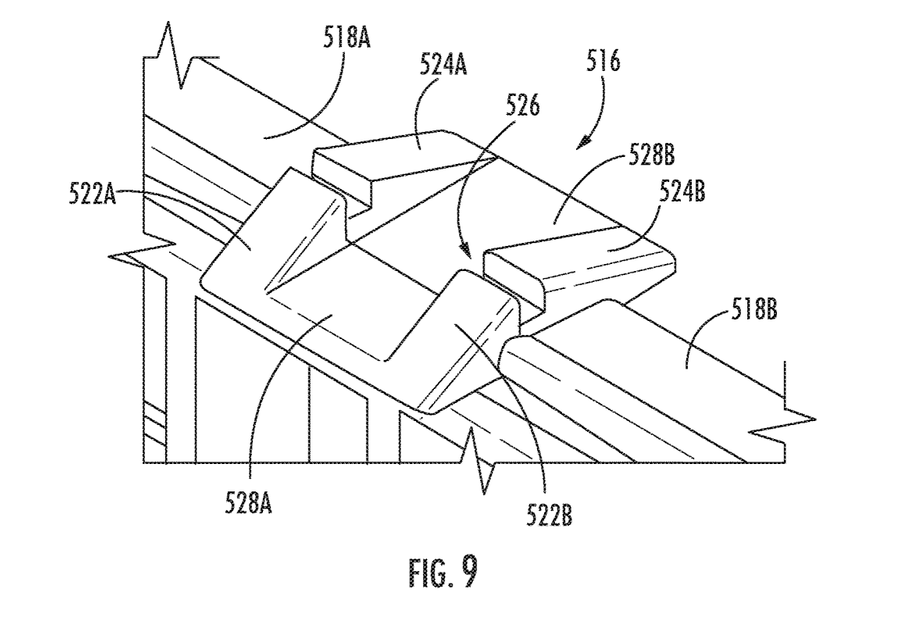
FIG. 9 is a top perspective view of the latch.

FIG. 9 is a top perspective view of the latch 516 and shows the front ramps, 522A, 522B, the rear ramps 524A, 524B, the top groove 526, and landings 528A, 528B. Landing 528A is between the ramps 522A and 522B. Landing 528B is between the ramps 524A and 524B. The landings 528A, 528B are preferably flat but may be, if desired, at a non-zero angle. Further, the angle of landing 528A may be the same as, or different from, the angle of landing 528B.

Latch 516 is shown in FIG. 5 as being approximately the width of a connector opening 210. This is a preference which is adequate for retention of the bidirectional intermediate modular adapter 500 in the mounting panel 100. It may, however, be wider if desired, such as in an environment where plugs are roughly inserted into or removed from the connectors 300, or narrower if desired, such as in an environment where less effort is preferable to depress the latch 516.

Also, the ramps 522A, 522B, 524A, 524B, are shown as being approximately 25% of the width of the latch 516, with the landings 528A, 528B being approximately 50% of the width of the latch 516. However, the ramps 522A, 522B, 524A, 524B may be a greater or smaller portion of the width of the latch 516, and the landings 528A, 528B may be a correspondingly smaller or greater portion of the width of the latch 516.

The deformable opening 520 is sufficiently large that the latch 516 can be depressed enough to allow the edge 105 to ride over the ramp and engage the groove 526.

The flexible beans 518A, 518B are flexible enough to allow the latch 516 to be depressed as discussed above, but sufficiently stiff to return the latch 516 to a position which engages the edge 105.

Figure 10:
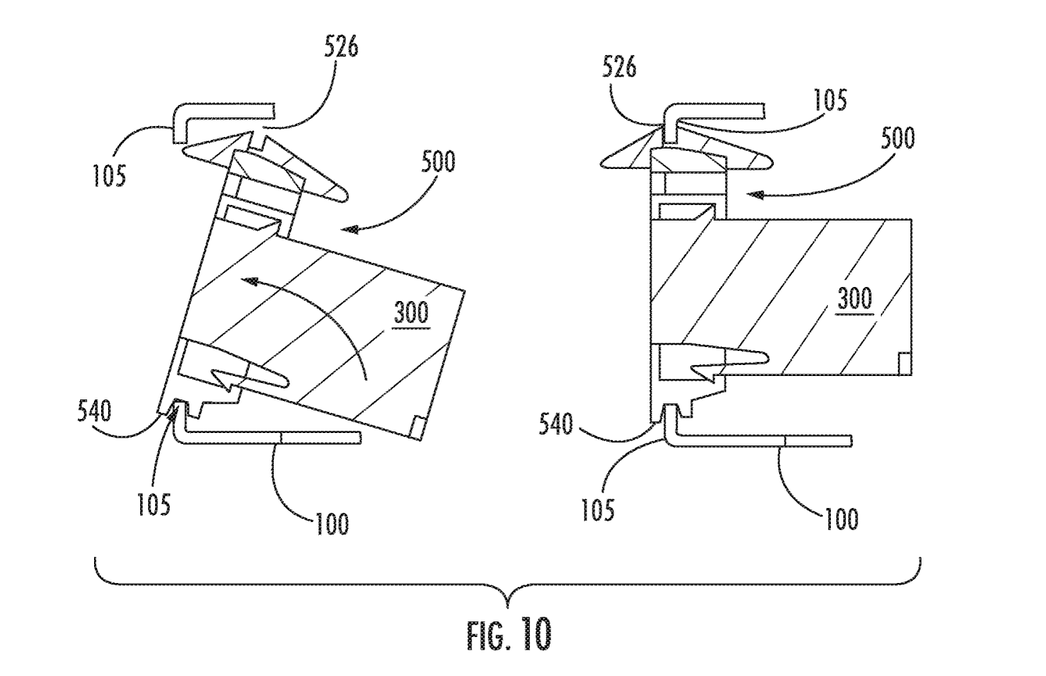
FIG. 10 illustrates installation of the bidirectional intermediate modular adapter from the rear side of a mounting panel.

FIG. 10 illustrates installation of the bidirectional intermediate modular adapter 500 from the back side of a mounting panel 100. The bottom groove 540 is placed over the edge 105, and then the bidirectional intermediate modular adapter 500 is rotated (counterclockwise in FIG. 10) toward the mounting panel 100 until the edge 105 locks into the top groove 526. As the bidirectional intermediate modular adapter 500 is rotated toward the mounting panel 100 the edge 105 will press down on the ramps 522A, 522B. The flexible beams 518A, 518B allow the latch 516 to deflect downward, thereby permitting the edge 105 ride over the ramps 522A, 522B and engage the top groove 526. A previously installed connector 300 is also shown. Alternatively, the connector 300 can be installed after the bidirectional intermediate modular adapter 500 is installed in the mounting panel 100.

Figure 11:
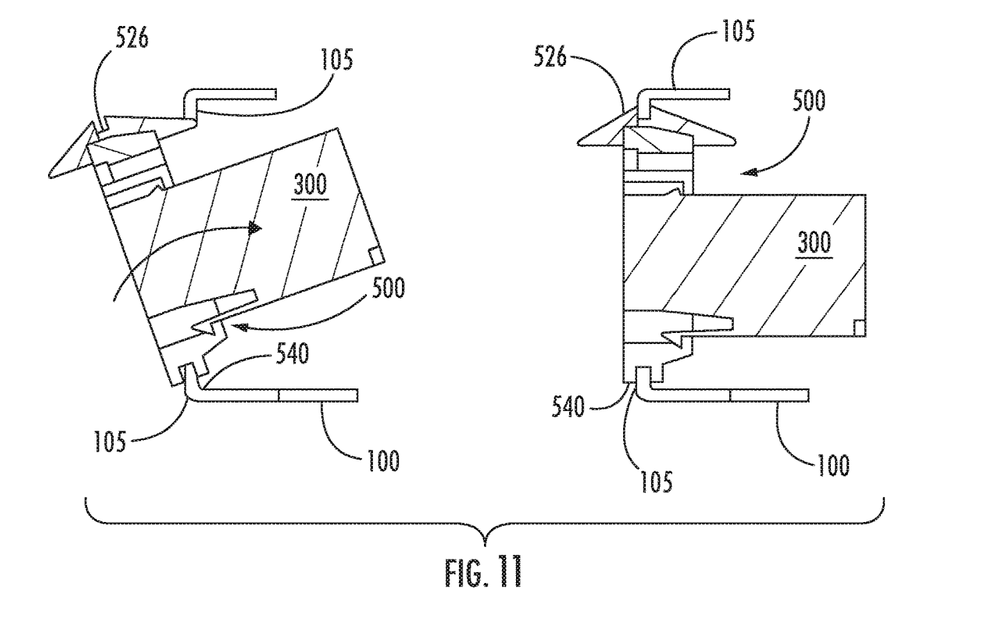
FIG. 11 illustrates installation of the bidirectional intermediate modular adapter from the front side of a mounting panel.

FIG. 11 illustrates installation of the bidirectional intermediate modular adapter 500 from the front side of a mounting panel 100. The bottom groove 540 is placed over the edge 105, and then the bidirectional intermediate modular adapter 500 is rotated (clockwise in FIG. 11) toward the mounting panel 100 until the edge 105 locks into the top groove 526. As the bidirectional intermediate modular adapter 500 is rotated toward the mounting panel 100 the edge 105 will press down on the ramps 524A, 524B. The flexible beams 518A, 518B allow the latch 516 to deflect downward, thereby permitting the edge 105 ride over the ramps 524A, 524B and engage the top groove 526. A previously installed connector 300 is also shown. Alternatively, the connector 300 can be installed after the bidirectional intermediate modular adapter 500 is installed in the mounting panel 100.

Removal of the bidirectional intermediate modular adapter 500 is easily accomplished by the user pressing down on one of the ramps 522A, 522B, or landings 528A, 528B, sufficiently to allow the top edge 105 to clear the top groove 526, rotating the bidirectional intermediate modular adapter 500 downward until the top edge 105 is no longer above the top groove 526, and lifting the bidirectional intermediate modular adapter 500 so that the lower groove 540 clears the lower edge 105. At this point the bidirectional intermediate modular adapter 500 has been disengaged from the mounting panel 100 and can be moved as desired.

Therefore, the ramps 522A and 522B on one side of the groove 526 and the ramps 524A and 524B on the other side of the groove 526, and 524 allow the bidirectional intermediate modular adapter 500 to be easily installed and removed from the front of the mounting panel 100 and easily installed and removed from the rear of the mounting panel 100.

Figure 12:
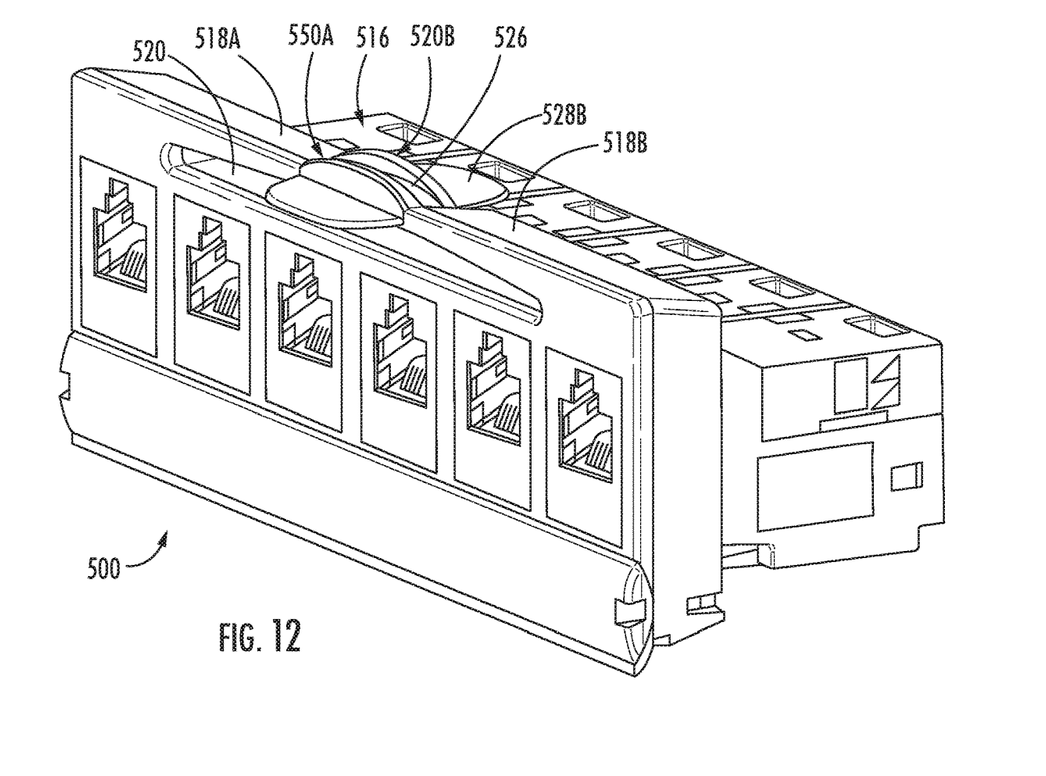
FIG. 12 is a perspective view of another embodiment of a bidirectionally insertable connector.

FIG. 12 is a perspective view of another embodiment of a bidirectional intermediate modular adapter 500. This embodiment does not have the ramps 522A, 522B of FIG. 5. In this embodiment, the latch 516 has landings or flat sections 528A, 528B. The landings 528A, 528B have stops or ridges 550A, 550B, at the inner ends thereof. The groove 526 is between the stops 550A, 550B. It will be appreciated that the groove 526 may be defined, at least in part, by the stops 550A, 550B.

To install the bidirectional intermediate modular adapter 500 the user places the lower groove 540 over the lower edge 105, presses down on one of the landings 528A, 528B sufficiently to allow the top edge 105 to clear the ridge 550A, 550B, rotates the bidirectional intermediate modular adapter 500 upward until the top edge 105 is over or in the top groove 526, and then releases the landing 528A, 528B.

Removal of the bidirectional intermediate modular adapter 500 is easily accomplished by the user pressing down on one of the landings 528A, 528B sufficiently to allow the top edge 105 to clear the ridge 550A, 550B, rotating the bidirectional intermediate modular adapter 500 downward until the top edge 105 is no longer above the top groove 526, and lifting the bidirectional intermediate modular adapter 500 so that the lower groove 540 clears the lower edge 105. At this point the bidirectional intermediate modular adapter 500 has been disengaged from the mounting panel 100 and can be moved as desired.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. For brevity and/or clarity, well-known functions or constructions may not be described in detail herein.

The term "exemplary" is used herein to mean serving as an example, instance, or illustration. Any aspect or design described herein as "exemplary" is not necessarily to be construed as preferred or advantageous over other aspects or designs. Similarly, examples are provided herein solely for purposes of clarity and understanding and are not meant to limit the subject innovation or portion thereof in any manner.

The terms "for example" and "such as" mean "by way of example and not of limitation." The subject matter described herein is provided by way of illustration for the purposes of teaching, suggesting, and describing, and not limiting or restricting. Combinations and alternatives to the illustrated embodiments are contemplated, described herein, and set forth in the claims.

For convenience of discussion herein, when there is more than one of a component, that component may be referred to herein either collectively or singularly by the singular reference numeral unless expressly stated otherwise or the context clearly indicates otherwise. For example, components N (plural) or component N (singular) may be used unless a specific component is intended. Also, the singular forms "a," "an," and "the" are intended to include the plural forms as well, unless expressly stated otherwise or the context indicates otherwise.

It will be further understood that the terms "includes," "comprises," "including," and/or "comprising" specify the presence of stated features, steps, operations, elements, and/or components, but do not preclude the presence or addition of one or more other features, steps, operations, elements, components, and/or groups thereof unless explicitly stated otherwise or the context clearly requires otherwise. The terms "includes," "has" or "having" or variations in form thereof are intended to be inclusive in a manner similar to the term "comprises" as that term is interpreted when employed as a transitional word in a claim.

It will be understood that when a component is referred to as being "connected" or "coupled" to another component, it can be directly connected or coupled or coupled by one or more intervening components unless expressly stated otherwise or the context clearly indicates otherwise.

The term "and/or" includes any and all combinations of one or more of the associated listed items. As used herein, phrases such as "between X and Y" and "between about X and Y" should be interpreted to include X and Y unless expressly stated otherwise or the context clearly indicates otherwise.

Terms such as "about", "approximately", and "substantially" are relative terms and indicate that, although two values may not be identical, their difference is such that the apparatus or method still provides the indicated or desired result, or that the operation of a device or method is not adversely affected to the point where it cannot perform its intended purpose. As an example, and not as a limitation, if a height of "approximately X inches" is recited, a lower or higher height is still "approximately X inches" if the desired function can still be performed or the desired result can still be achieved.

While the terms vertical, horizontal, upper, lower, bottom, top and the like may be used herein, it is to be understood that these terms are used for ease in referencing the drawing and, unless otherwise indicated or required by context, does not denote a required orientation.

The different advantages and benefits disclosed and/or provided by the implementation(s) disclosed herein may be used individually or in combination with one, some or possibly even all of the other benefits. Furthermore, not every implementation, nor every component of an implementation, is necessarily required to obtain, or necessarily required to provide, one or more of the advantages and benefits of the implementation.

Conditional language, such as, among others, "can", "could", "might", or "may", unless specifically stated otherwise, or otherwise understood within the context as used, is generally intended to convey that certain embodiments preferably or optionally include certain features, elements and/or steps, while some other embodiments optionally do not include those certain features, elements and/or steps. Thus, such conditional language indicates, in general, that those features, elements and/or step may not be required for every implementation or embodiment.

Those skilled in the art will recognize that modifications may be made to the implementation(s) disclosed herein without departing from the scope or spirit of the claimed subject matter. The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the exemplary embodiments and applications illustrated and described, and without departing from the spirit and scope of the following claims.

What has been described above includes examples of aspects of the claimed subject matter. It is, of course, not possible to describe every conceivable combination of components or methodologies for purposes of describing the claimed subject matter, but one of ordinary skill in the art may recognize that further combinations and permutations of the disclosed subject matter are possible. Accordingly, the disclosed subject matter is intended to embrace all such alterations, modifications and variations that fall within the spirit and scope of the appended claims.

Although the subject matter presented herein has been described in language specific to components used therein, it is to be understood that the appended claims are not necessarily limited to the specific component or characteristic thereof described herein. Rather, the specific components and characteristics thereof are disclosed as example forms of implementing the claims.

From the foregoing description of various embodiments of the invention, it will be apparent that modifications may be made therein. It is understood that these embodiments of the invention are exemplifications of the invention only and that the invention is not limited thereto.

The invention claimed is:

1. A bidirectional intermediate modular adapter comprising: a body comprising:
    a first face and an opposing second face; an opening extending from the first face through the body to the opposing second face;
    a first side surface and an opposing second side surface; an upper surface comprising a flexible top section with a first groove; and an opposing lower surface comprising a second groove extending at least partially lengthwise across the opposing lower surface;
    wherein the flexible top section comprises: a first flexible beam anchored toward a first end of the flexible top section; a second flexible beam anchored toward a second end of the flexible top section; and a latch between, supported by, and connected to, the first flexible beam and the second flexible beam;
    wherein the latch comprises: a first landing with a first stop at an inner end thereof; and a second landing with a second stop at an inner end thereof; wherein the first groove between the first stop and the second stop.

2. The bidirectional intermediate modular adapter of claim 1, wherein the first ramp has a first slope and the second ramp has a second slope, the first slope being greater than the second slope.

3. The bidirectional intermediate modular adapter of claim 1, wherein the first ramp has a first section, a second section, and a third section, the third section being between the first section and the second section, the first section and the second section having a first slope, and the third section having a second slope, the second slope being less than the first slope.

4. The bidirectional intermediate modular adapter of claim 1, wherein the opposing lower surface comprises a ridge set away from the first face, the second groove being defined between the first face and the ridge.

5. The bidirectional intermediate modular adapter of claim 1, wherein at least a portion of the second groove is coated with a conductive material.

6. The bidirectional intermediate modular adapter of claim 1, wherein the second groove engages a lower edge in an opening in a mounting panel.

7. The bidirectional intermediate modular adapter of claim 1, wherein the first groove engages an upper edge in an opening in a mounting panel.

8. The bidirectional intermediate modular adapter of claim 1, wherein at least one of: the first face extends beyond the first side surface; or the opposing second face extends beyond the second side surface.

9. The bidirectional intermediate modular adapter of claim 1, wherein at least one of: the first face extends beyond the lower surface; or the opposing second face extends beyond the lower surface.

10. The bidirectional intermediate modular adapter of claim 1, the first flexible beam, the second flexible beam, and the latch define a deformable opening in the body.

11. The bidirectional intermediate modular adapter of claim 1, wherein, the latch comprises: a first ramp; and a second ramp;
wherein the first groove is at the apex formed by the first ramp and the second ramp.

12. The bidirectional intermediate modular adapter of claim 11, wherein the first ramp extends from the first groove to at least the first face; and the second ramp extends from the first groove to at least the opposing second face.

13. The bidirectional intermediate modular adapter of claim 1, wherein the body is a nonconductive material.

14. The bidirectional intermediate modular adapter of claim 13, wherein at least a portion of the body is coated with a conductive material.

15. A bidirectional intermediate modular adapter comprising:
a body comprising:
a front face and an opposing rear face;
an opening extending from the front face through the body to the opposing rear face;
a first side surface and an opposing second side surface;
an upper surface comprising a first flexible beam anchored toward a first end of the upper surface, a second flexible beam anchored toward a second end of the upper surface, a latch between, supported by, and connected to, the first flexible beam and the second flexible beam, and a first groove; and
an opposing lower surface comprising a second groove extending at least partially lengthwise across the opposing lower surface;
wherein the latch comprises a first landing with a first stop at an inner end thereof, a second landing with a second stop at an inner end thereof, and the first groove is defined at least in part by the first stop and the second stop.

16. The bidirectional intermediate modular adapter of claim 15, wherein the first flexible beam, the second flexible beam, and the latch define a deformable opening in the body.

17. A bidirectional intermediate modular adapter comprising:
a body comprising:
a first side surface and an opposing second side surface;
a front face and an opposing rear face, the front face being forward of the first side surface and the second side surface;
an opening extending from the front face through the body to the opposing rear face;
an upper surface comprising a first flexible beam anchored toward a first end of the upper surface, a second flexible beam anchored toward a second end of the upper surface, and a latch between, supported by, and connected to, the first flexible beam and the second flexible beam;
the latch comprising a first landing with a first stop at an inner end thereof, a second landing with a second stop at an inner end thereof, and a first groove defined at least in part by the first stop and the second stop; and
an opposing lower surface comprising a second groove extending at least partially lengthwise across the opposing lower surface.

* * * * *